UNITED STATES PATENT OFFICE.

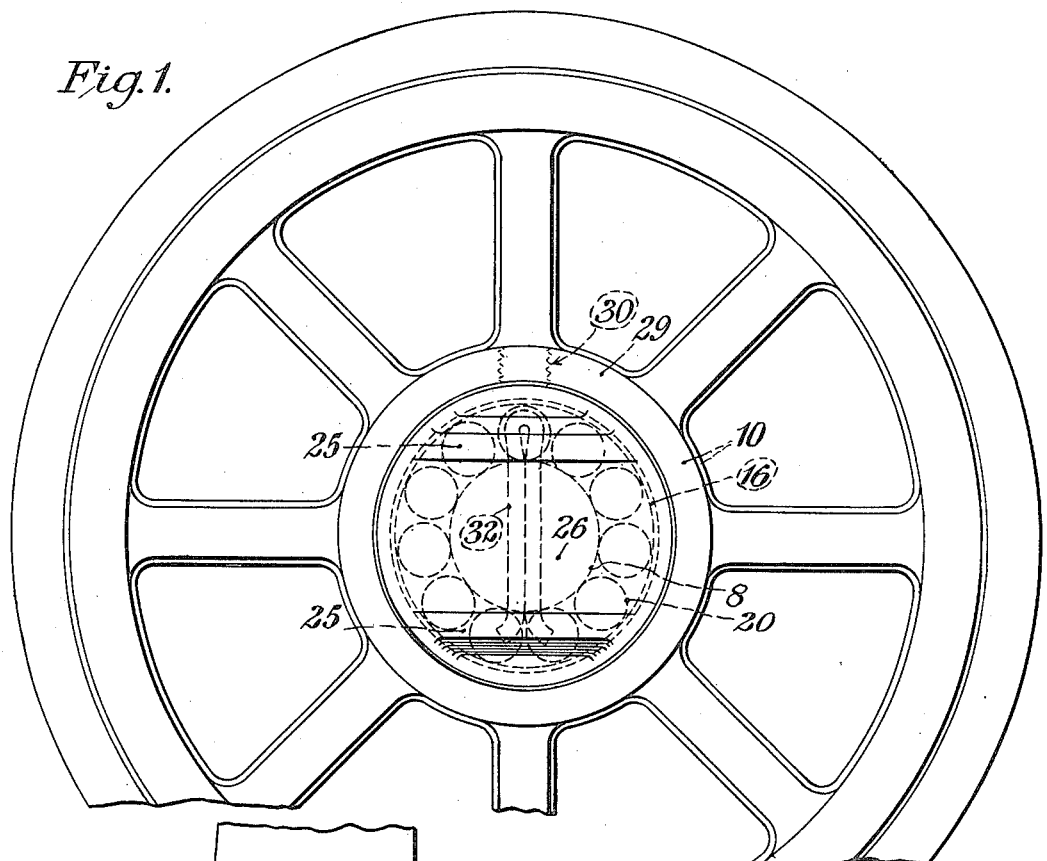
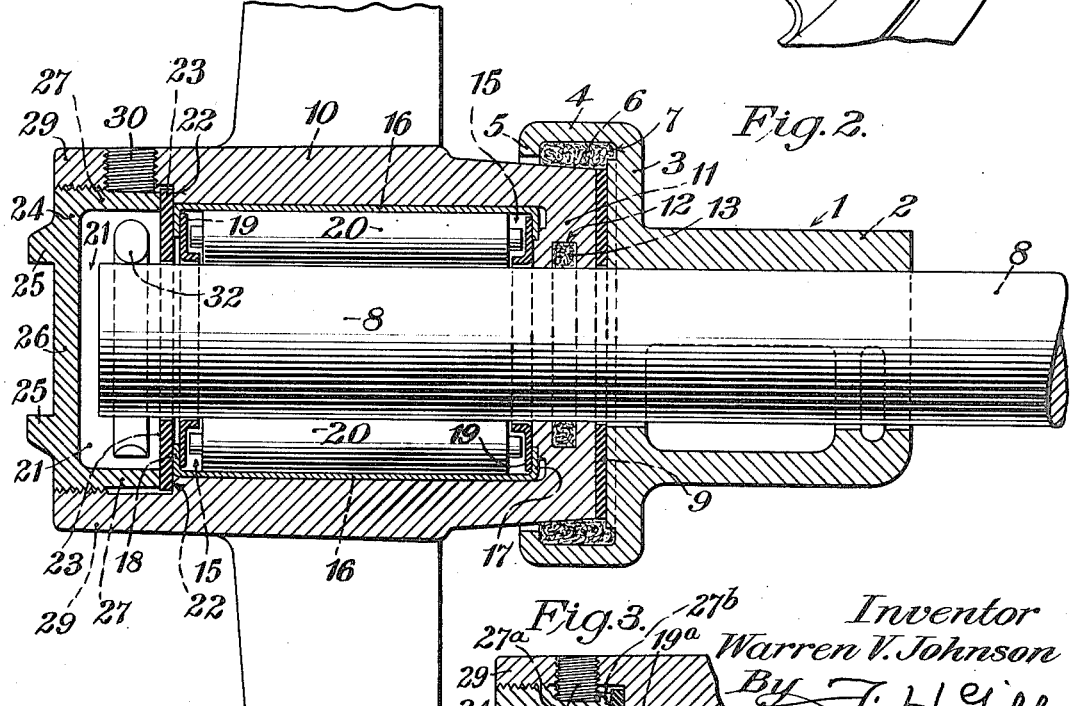
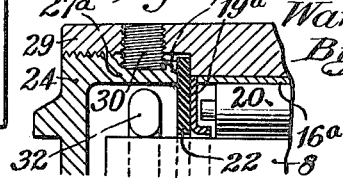

WARREN V. JOHNSON, OF BLOOMSBURG, PENNSYLVANIA, ASSIGNOR TO AMERICAN CAR AND FOUNDRY COMPANY, OF ST. LOUIS, MISSOURI, A CORPORATION OF NEW JERSEY.

MINE-CAR WHEEL AND MEANS FOR ATTACHING SAME.

1,256,136.   Specification of Letters Patent.   Patented Feb. 12, 1918.

Application filed July 11, 1917. Serial No. 179,874.

*To all whom it may concern:*

Be it known that I, WARREN V. JOHNSON, residing at Bloomsburg, Columbia county, State of Pennsylvania, and being a citizen of the United States, have invented certain new and useful Improvements in Mine-Car Wheels and Means for Attaching Same, of which the following is a full, clear, and exact description, such as will enable others skilled in the art to which it appertains to make and to use the same, reference being had to the accompanying drawings, which illustrate the preferred form of the invention, though it is to be understood that the invention is not limited to the exact details of construction shown and described, as it is obvious that various modifications thereof within the scope of the claims will occur to persons skilled in the art.

In said drawings:

Figure 1 is an end elevational view of my improved wheel;

Fig. 2 is a vertical longitudinal view taken centrally through the wheel and showing the axle in elevation; and Fig. 3 is a fragmentary vertical sectional view, substantially as in Fig. 2, illustrating a slightly modified form of construction.

An object of the invention is to provide in a roller bearing wheel, a simple and economical construction which will permit the use of roller bearings of various types, which roller bearings are properly positioned within the roller bearing chamber within the hub of the wheel and are held in position by a washer which has been heretofore commonly employed in connection with the linch pin passing through the axle, and which washer is by me employed to hold the roller bearing assembly in position and to prevent the linch pin coming into contact with the roller bearing assembly carried within the wheel hub.

Another feature is an adjustable lubricant cup which is movable longitudinally of the axle, is adapted to contain a quantity of lubricant which may be forced into the wheel while seating the said cup and which cup may be locked in position by means projecting through the wheel hub and bearing upon an inwardly extending flange of said cup.

Referring to the parts, 1 is a pedestal box of ordinary construction comprising an elongated bearing 2 from which radiates the web 3, integral with which is formed a perimetrical flange 4 and inturned flanged portion 5, the parts 3, 4 and 5 coöperating to hold within them a packing 6 of hair, felt or other suitable material, and it is to be noted that the web is undercut at 7 to serve as a seat for said packing. In position, as for use upon the axle 8, next outwardly of the pedestal box is a metal washer 9 interposed between the pedestal box and the wheel hub 10, which latter is formed with axle bores of a plurality of diameters, the bore within the rear hub portion 11 being less than within any other zone of the wheel, and in said portion 11 there is preferably formed an annular recess 12 within which is seated a packing 13 to limit the flow of lubricant from the wheel toward the pedestal box.

Within the main or central portion of the hub, is the roller bearing chamber 15 in which is shown a roller bearing assembly comprising the cylinder 16, which is shown as provided with integral end flanges 17 and 18, which flanges are adapted to hold in position annuli 19 which coöperate with the spindles of the rollers 20 to hold said rollers in position. In Fig. 3 the flange 18 is omitted and the annular ring 19$^a$ may be used without said flanges.

Progressing outwardly toward the outer face of the wheel and next beyond the roller bearing chamber, is a lubricant chamber 21 which is of larger diameter than said roller bearing chamber, whereby a shoulder 22 is formed thereby providing a seat for the metal washer 23, which is of larger diameter than said roller bearing chamber, and when held in position, as hereinafter described, serves as a means for retaining the roller bearing assembly in position within the wheel hub. Seated within the lubricant chamber 21 is an adjustable screw-threaded flanged cup 24 provided on its outer face with projections 25 which form, with the end wall 26, a socket in which a bar or other convenient means may be inserted to rotate said cup and thereby screw the same in position within said lubricant chamber to cause the inwardly disposed flange 27 of said cup to bear upon the washer 23, thereby holding said washer in position and in turn locking the roller bearing assembly within the roller bearing chamber of the wheel. The annular flange 29 forming the outer end of the wheel hub is perforated, screw-threaded and in service is filled by a plug 30 which contacts with the inwardly disposed flange 27 of said lubricant cup and coöperates with the flange 27 of said cup to lock the cup in position within the wheel. Within the lubricant chamber 21, the axle is penetrated by a linch pin 32 which projects at each end through said axle into said lubricant chamber and serves as an agitator for any lubricant which may be contained therein, thereby facilitating lubrication of said axle, even though but a small quantity of lubricant may remain within the outer end of the wheel hub. When it is desired to supply fresh lubricant to the hub the cap may be removed, filled with lubricant, placed in position, and screwed home to the position shown in Fig. 2, whereupon more or less of the lubricant placed in said cup will be forced through the opening between the washer 22 and the axle and into the roller bearing chamber. When it is desired to remove the wheel from the axle, the lubricant cup is retracted, the plug 30 is removed, and the linch pin 32 may be removed through the opening in which said plug is seated. In the modification shown in Fig. 3, the flange 27ª of the cup is provided with an annular ring 27ᵇ which rests between the plug 30 and washer 22, while the annulus 19ª is in alinement with, but is not inclosed by, flanges from the cylindrical sleeve 16ª. Otherwise the construction is the same as in the other figures.

What I claim is:

1. In combination in a mine car, a pedestal box having an enlarged open end, packing seated in said open end, a wheel having a hub portion rotatable in said open end, said wheel having an axle bore of a plurality of diameters one of which serves as a roller bearing chamber and one as a lubricant chamber, a washer in said lubricant chamber of larger diameter than the roller bearing chamber, an axle extended through said pedestal box and said roller bearing chamber and into but not through said lubricant chamber, a linch pin seated in said axle in said lubricant chamber and an adjustable cap adapted to contain lubricant and force the same into said hub and also to hold said washer in position.

2. In a car wheel, a cast hub portion including a roller bearing chamber and a lubricant chamber at the end thereof thereby forming a shoulder, a roller bearing in said bearing chamber, a washer in said lubricant chamber, and a closed cup having an inwardly disposed flange seated in said lubricant chamber and being movable to force said washer against said shoulder, said washer thereupon holding said roller bearing in position.

3. In a car wheel, a cast hub portion including a roller bearing chamber and a lubricant chamber at the end thereof thereby forming a shoulder, a roller bearing roller supporting annulus in said bearing chamber, a washer in said lubricant chamber, and a closed cup having an inwardly disposed flange seated in said lubricant chamber and being movable to force said washer against said shoulder, said washer then holding said annulus in position.

4. In a car wheel, a cast hub portion including a roller bearing chamber and a lubricant chamber at the end thereof thereby forming a shoulder, a washer resting in said lubricant chamber against said shoulder, a roller bearing held in position by said washer, an adjustable flanged lubricant cup seated in said lubricant chamber, the hub having an opening for the insertion of a linch pin, and a screw-threaded plug therein interlocking with said lubricant cup.

5. In combination in a mine car, a pedestal box having an open end, a wheel having a hub with a portion rotatable in said open end, said hub having an axle bore of a plurality of diameters forming roller bearing and lubricant chambers, a washer in the lubricant chamber of greater diameter than the roller bearing chamber, an axle extended through said pedestal box and the roller bearing chamber and entering the lubricant chamber, a linch pin connected to said axle in the latter chamber and an adjustable cap adapted to contain and force lubricant into said hub and also to force said washer into position.

6. In combination, a wheel with a hub having a roller bearing chamber and a lubricant chamber of greater diameter forming a shoulder in the hub wall at contiguous ends of said chambers, an axle, a roller bearing in said bearing chamber, a washer of greater diameter than said bearing chamber in said lubricant chamber, and a cup closing a hub end capable of unretarded movement into the lubricant chamber to force said washer against said shoulder to retain said roller bearing.

7. In combination, a wheel hub with an open end and having a bore with succeeding portions of increasing diameter and forming a shoulder inset from the open hub end, an axle extending through and nearly closing the bore portion nearest the opposite hub end, a roller bearing in an intermediate bore portion, a washer of larger diameter than said intermediate bore portion, and a lubricant-compressing cup movable into the bore portion nearest the open hub end adapted to retain lubricant therein and force said washer against said shoulder to retain said roller bearing.

In witness whereof I have hereunto set my hand in the presence of two witnesses.

WARREN V. JOHNSON.

Witnesses:
  FRED D. HUGHES,
  CARL HARMAN.